United States Patent
Zillmer et al.

(10) Patent No.: US 8,020,651 B2
(45) Date of Patent: Sep. 20, 2011

(54) HYBRID MOTOR VEHICLE AND METHOD FOR CONTROLLING OPERATION OF A HYBRID MOTOR VEHICLE

(75) Inventors: Michael Zillmer, Sickte (DE); Matthias Holz, Lehre (DE); Ekkehard Pott, Gifhorn (DE); David Prochazka, Libosovice (CZ)

(73) Assignees: VOLKSWAGEN Aktiengesellschaft, Wolfsburg (DE); Skoda Auto A.S., Mladá Boleslav (CZ)

( * ) Notice: Subject to any disclaimer, the term of this patent is extended or adjusted under 35 U.S.C. 154(b) by 741 days.

(21) Appl. No.: 11/719,350

(22) PCT Filed: Oct. 19, 2005

(86) PCT No.: PCT/EP2005/011372
§ 371 (c)(1),
(2), (4) Date: May 15, 2007

(87) PCT Pub. No.: WO2006/053624
PCT Pub. Date: May 26, 2006

(65) Prior Publication Data
US 2009/0146615 A1    Jun. 11, 2009

(30) Foreign Application Priority Data
Nov. 16, 2004    (DE) .......................... 10 2004 055 128

(51) Int. Cl.
*B60K 6/26* (2007.10)
(52) U.S. Cl. .................................................. 180/65.285
(58) Field of Classification Search ............... 180/65.21, 180/65.22, 65.25, 65.26, 65.275, 65.285; 903/930
See application file for complete search history.

(56) References Cited

U.S. PATENT DOCUMENTS

| | | | |
|---|---|---|---|
| 5,212,431 A | | 5/1993 | Origuchi et al. |
| 5,550,445 A | * | 8/1996 | Nii .................................. 318/153 |
| 5,778,326 A | * | 7/1998 | Moroto et al. .................. 701/22 |
| 5,786,540 A | | 7/1998 | Westlund |
| 5,786,640 A | | 7/1998 | Sakai et al. |
| 5,789,882 A | * | 8/1998 | Ibaraki et al. ................. 318/148 |
| 5,848,659 A | | 12/1998 | Karg et al. |
| 5,880,533 A | * | 3/1999 | Arai et al. ....................... 290/31 |
| 5,898,282 A | * | 4/1999 | Drozdz et al. ................ 318/139 |

(Continued)

FOREIGN PATENT DOCUMENTS
DE    41 16 899 A1    11/1991
(Continued)

*Primary Examiner* — Frank Vanaman
(74) *Attorney, Agent, or Firm* — Norris, McLaughlin & Marcus, P.A.

(57) ABSTRACT

A method controls an operation of a motor vehicle equipped with a hybrid drive unit having a combustion engine and at least one electric machine that can be selectively operated as a motor or as a generator. The electric machine, when in generator mode, charges an energy store and/or supplies power to a vehicle electrical system of the motor vehicle. In generator mode, the electric machine is operated in alternating intervals, while maintaining predefined boundary conditions. In a first interval, the electric machine is operated with a first high electrical power output that is higher than an actual power consumption of the vehicle electrical system of the motor vehicle. The electric machine is switched off in a second interval. This largely prevents the electric machine from approaching operating points under light load which have a low efficiency and achieves a fuel advantage in comparison to a continuous operating mode.

20 Claims, 3 Drawing Sheets

U.S. PATENT DOCUMENTS

| | | | |
|---|---|---|---|
| 6,163,135 A * | 12/2000 | Nakayama et al. | 320/150 |
| 6,258,008 B1 | 7/2001 | Tabata et al. | |
| 6,333,612 B1 | 12/2001 | Suzuki et al. | |
| 6,369,539 B1 | 4/2002 | Morimoto et al. | |
| 6,429,613 B2 | 8/2002 | Yanase et al. | |
| 6,480,767 B2 * | 11/2002 | Yamaguchi et al. | 701/22 |
| 6,484,833 B1 | 11/2002 | Chhaya et al. | |
| 6,561,296 B2 | 5/2003 | Obayashi | |
| 2002/0038733 A1 | 4/2002 | Obayashi | |

FOREIGN PATENT DOCUMENTS

| | | |
|---|---|---|
| DE | 43 11 230 C2 | 12/1996 |
| DE | 103 18 882 A1 | 11/2004 |
| EP | 1 090 803 A | 4/2001 |
| EP | 1 283 122 A | 2/2003 |
| JP | 9074612 A | 3/1997 |
| JP | 2002118904 A | 4/2002 |
| JP | 2002369592 A | 12/2002 |

\* cited by examiner

HYBRID MOTOR VEHICLE AND METHOD FOR CONTROLLING OPERATION OF A HYBRID MOTOR VEHICLE

This is an application filed under 35 USC 371 of PCT/EP2005/011372.

The invention relates to a method for controlling the operation of a motor vehicle with a hybrid drive unit, which includes an internal combustion engine and in addition at least one electric machine which can be selectively switched to a motor or a generator mode, wherein the electric machine powers a vehicle electrical system of the motor vehicle and/or charges an energy store. The invention also relates to a hybrid vehicle with a corresponding controller.

BACKGROUND

The term hybrid vehicle refers to motor vehicles where at least two drive units are combined, relying on different energy sources for providing power to drive the vehicle. In a particularly preferred configuration, the properties of an internal combustion engine which produces kinetic energy by burning gasoline or diesel fuel, complements the properties of an electric machine which converts electric energy into motion energy. Modern hybrid vehicles are therefore predominantly equipped with a combination of an internal combustion engine and one or several electric machines. Two different hybrid concepts have been proposed. In the so-called serial or sequential hybrid concept, the vehicle is driven exclusively by the electric machine, while the internal combustion engine uses a separate generator to generate the electric current to charge an energy store that powers the E-machine, or alternatively powers the E-machine directly. More recently, however, parallel hybrid concepts are preferred at least in passenger vehicle applications, wherein the vehicle can be powered by both the internal combustion engine and by the E-machine.

The electric machines employed in these parallel concepts can be selectively operated in motor mode or in generator mode. For example, the E-machine operating in motor mode is typically added at operating points with higher vehicle loads in order to support the internal combustion engine. The E-machine can also operate as a starter motor for the internal combustion engine. Conversely, when the vehicle is powered by the internal combustion engine, the E-machine is operated predominately as a generator, with the electric power generated by the E-machine being used, for example, to charge the energy store and/or to supply a vehicle electrical system. With a split-power hybrid concept employing more than one E-machine, an E-machine operating in generator mode can also be used to supply power to another E-machine. In addition, at least a portion of the braking power is typically supplied by the E-machine operating in generator mode (recuperation), whereby a portion of the dissipated mechanical energy is converted into electric energy. Advantageously, with hybrid concepts, the E-machines generally operate with better efficiency than conventional claw pole generators.

Asynchronous machines (ASM) or permanent-excited synchronous machines (PSM) are examples of currently employed E-machines. With these types of machines, the efficiency disadvantageously decreases significantly at very low torque demand, i.e., when little electric power is supplied. Consequently, at a relatively low electric load, a disproportionately large amount of mechanical energy and therefore fuel must be supplied to the internal combustion engine to enable the E-machine to generate the required electric power.

SUMMARY

It is an object of the present invention to propose a method for controlling a hybrid vehicle which provides a more effective and, as a result, fuel-saving application of the electric machine(s) in a parallel hybrid concept.

This object is solved with a method as well as with a motor vehicle with the features of the independent claims. According to the invention, while maintaining predetermined boundary conditions, the electric machine operates in generator mode in alternating intervals (pulse charge operation), wherein (a) in a first interval, the electric machine is operated with a first, high electric power output which is greater than an actual power consumption of the vehicle electrical system, and (b) is switched off in a second interval.

Operation at load points located between extremes with unfavorable efficiencies can be largely prevented, on one hand, by operating the electric machines alternatingly with a supply of electric power that is significantly higher than the power demanded by the vehicle electrical system (and possibly by the energy store to charge the energy store to a predetermined charge state) and, on the other hand, by switching the electric machines completely off in intermediate intervals. This significantly increases the overall efficiency of the electric machine as well as that of the entire hybrid engine compared to conventional drive units, while also using less fuel. If necessary, the high electric power supplied by the E-machine can be used in the first interval to charge the electric energy store (to its nominal charge state, optionally plus a buffer amount) and/or for charging the vehicle electrical system of the motor vehicle, which includes power consumed by the electric users as well as power used for charging an optional buffer battery (typically a 12 V car battery). Conversely, in the second interval, the vehicle electrical system is supplied from the energy store that was charged during the first interval (and optionally from the car battery).

According to a preferred embodiment of the invention, switching between the intervals in the generator mode occurs depending on predefined threshold values for a charge state of the energy store of the electric machine. In particular, the first interval is terminated when a charge state of the energy store reaches an upper switching threshold, whereas the second interval (with the E-machine switched off) is terminated when the charge state of the energy store reaches a lower switching threshold. The charge state of the energy store then oscillates about a nominal charge state. The upper and lower threshold values can be preset with the same or with a different separation from the nominal charge state. The nominal charge state is computed depending on the operating point and on the size of the energy store as well as the type of the energy store as a compromise between recuperation potential, boost potential, service life of the energy store, and cold start reliability.

As has been indicated above, the alternating generator operation depends on maintaining preset boundary conditions. Preferably, boundary conditions are defined which ensure that pulsed operation has an improved efficiency compared to continuous operation at low supplied power. Accordingly, employing this method most preferably requires that an actual power demand by the vehicle electrical system or energy store, preferably for the total power demand of both is less than a threshold value. The actual power demand of the electric energy store refers to a demand for electric power for charging the energy store to a predetermined charge state, which is typically less than the maximum charge state. Alternatively or in addition, for alternating generator operation, undershooting another threshold value may be required, which relates to a ratio of the actual power demand of vehicle electrical system and/or energy store to a maximum possible actual generator power supply of the E-machine for an actual operating point of the vehicle. The method is most preferably employed when the electric machine is operated in a region where the efficiency characteristic of the electric machine depends very little on the rotation speed.

Most preferably, the alternating pulse charge operation of the E-machine is made conditional of a so-called efficiency accounting, which is performed before and during the alternating operation. In this case, the alternating operation of the invention is only performed if (and only performed as long as) this accounting shows that a threshold value for an efficiency advantage to be achieved is reached or exceeded in comparison to the conventional continuous operation. The efficiency accounting most preferably also takes into consideration a shift in the load level of the internal combustion engine, which occurs to compensate for the higher drive torque of the internal combustion engine due to the shift in the load level of the E-machine.

Other predefinable boundary conditions can relate to the visualization of the pulse charge operation. For example the nominal charge state of the energy store may have to remain in a particular range, particularly may have to maintain a minimum separation from a permissible upper and lower limit value for the charge state. This is necessary for visualizing the amplitudes of the alternating charge state about the nominal charge state.

According to another advantageous embodiment of the method, the nominal charge state is intentionally defined so that adequate separation to the permissible upper and/or limit value is maintained for operating in pulse charge mode.

Preferably, the torque changes produced by the pulse charge method of the invention are compensated by the internal combustion engine, in particular in the form of an increased cylinder charge, to prevent adverse effects on the driving performance. Because any torque compensation can only occur with a limited speed and accuracy, additional boundary conditions are advantageously defined which allow the alternating generator operation of the invention only in those operating situations, where only relatively small torque changes occur, or where torque changes can be easily compensated. In this context, alternating operation can be permitted when at least one of the following boundary conditions affecting torque compensation are satisfied:

a minimum separation between an actual torque of the internal combustion engine and a maximum torque of the internal combustion engine (full load characteristic) is maintained; in particular, the actual torque of the internal combustion engine should be at most 75%, preferably at most 85%, most preferably at most 90% of the full load torque;

the internal combustion engine is not actually operated, or is not expected to be operated after a load level shift, with an enriched mixture for protecting components;

the vehicle has an actual minimum speed, in particular at least 15 km/h, preferably at least 25 km/h, most preferably at least 40 km/h; and a minimum gear of a vehicle transmission is engaged, in particular the third or a higher gear.

It may also be advantageous for compensating torque to limit the maximum generator power of the electric machine during the first interval (i.e., during pulse charging) to a maximum value.

A more detailed description of the various boundary conditions will be given with reference to the exemplary embodiments.

The invention also relates to a motor vehicle which includes control means configured to control the alternating generator operation of the electric machine of the invention as described above. The control means according to the invention include, in particular, a program algorithm for controlling the pulse charge operation of the invention, whereby the program algorithm can be stored in a general motor controller or in a separate control unit.

Additional preferred embodiments of the invention are recited as additional features of the dependent claims.

BRIEF DESCRIPTION OF THE DRAWINGS

Exemplary embodiments of the invention will now be described with reference to the appended drawings.

DETAILED DESCRIPTION OF THE INVENTION

Figure 1:
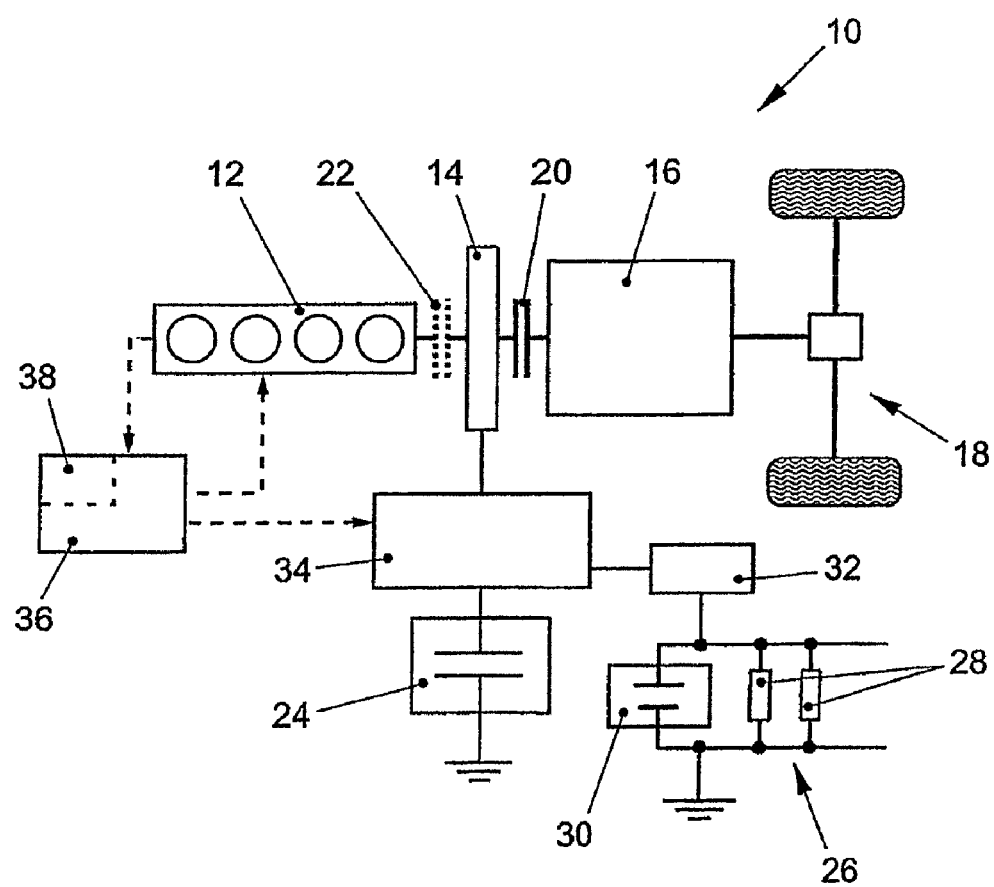
FIG. 1 shows a schematic diagram of the construction of a hybrid drive unit according to the invention.

FIG. 1 shows a parallel hybrid drive unit, indicated with the reference symbol 10, of a hybrid vehicle (not shown). The vehicle is driven selectively or simultaneously by a conventional internal combustion engine 12 (gasoline or diesel engine) and an electric machine (E-machine) 14, which both drive the same shaft, in particular the crankshaft of the internal combustion engine 12. The E-machine 14 can be connected with the engine crankshaft in different ways. For example, the E-machine 14 can be directly coupled with the crankshaft or via a clutch, or via a drive belt, a toothed belt, a gear or another positive and/or nonpositive connection. The internal combustion engine 12 and the E-machine 14 are coupled with the indicated drive train 18 via an automatic or a manual transmission 16. The drive shafts of the internal combustion engine and the E-machine 14, respectively, are decoupled from the transmission 16 by a clutch 20, which can be disengaged by the driver by depressing a clutch pedal (not shown) and is engaged when the pedal is not depressed.

FIG. 1 also indicates an optional additional clutch 22 arranged between the internal combustion engine 12 and the E-machine 14. Such additional clutch 22 allows separate disengagement of the internal combustion engine 12 from the drive train 18 and from the E-machine 14, respectively, which has the fundamental advantage that the mechanical friction resistance of the internal combustion engine 12 is not carried along when the internal combustion engine 12 is switched off. The additional clutch 22 can potentially save fuel, but is expensive, complex to manufacture and requires considerable installation space. In the context of the present invention, the additional clutch 22 between the internal combustion engine 12 and the E-machine 14 is fundamentally feasible, but is preferably not employed.

The E-machine 14, which may be, for example, a three-phase asynchronous motor or a three-phase synchronous motor, can be selectively operated in motor or generator mode. In motor mode, the E-machine 14 drives the drive train 18 by consuming electric energy (current) derived from an energy store 24. Losses in the efficiency during charging and discharging processes must also be taken into account when considering the overall efficiency of the method of the invention. Therefore, those types of energy stores are typically preferred which have a high efficiency for these processes. Capacitor stores are particularly preferred, because they have a significantly higher charging and discharging efficiency than batteries (for example, lead acid, nickel-metal hydride or lithium ion batteries). The energy store 24 can also be a combined system, consisting of a battery (30, see below) and a capacitor store connected in parallel, wherein the capacitor store preferably takes over the majority of the cyclical charging and discharging processes. In addition, to quickly generate high torques, the E-machine 14 can, for example, be operated in motor mode in support of the connected internal combustion engine 12.

Conversely, in generator mode, the E-machine 14 is driven by the internal combustion engine 12 or by the inertia of the vehicle. The E-machine 14 converts the kinetic energy into electric energy for charging the energy store 24 and for supplying power to a vehicle electrical system of the vehicle, indicated by the reference symbol 26. The vehicle electrical system 26 includes a plurality of electrical users 28 and can optionally also include a buffer battery 30, typically a conventional 12 V car battery. An intermediate DC/DC converter 32 converts the energy generated by the E-machine 14 in generator mode to a voltage of 12 V at which the vehicle electrical system 26 operates.

The electric motor 14 is switched between motor and generator mode by power electronics 34, which has an integrated inverter to optionally convert, depending on the type of the electric machine, between DC and AC current. The power electronics 34 also controls the rotation speed and/or torque of the E-machine 14 in motor mode and/or controls the generated electric power in generator mode. To this end, for example, a rotation speed of the rotating field of the stator (with three-phase machines) is changed or a magnetic field strength is changed by changing the excitation voltage or the excitation current. The optionally regulated values also depend on the machine type. In particular, for changing the supplied generator power at a predetermined rotation speed, the stator voltage and frequency of an asynchronous motor can be varied continuously by using a frequency converter.

According to the illustrated concept, the vehicle is driven predominantly by the internal combustion engine 12 which is started by the electric motor 14 configured as a starter generator. The electric motor 14 also provides a boost function by being switched in to aid the vehicle drive (motor mode), in particular during acceleration of the vehicle. On the other hand, the electric motor 14 has a so-called recuperation function in those driving situations where the vehicle has excess kinetic energy, by converting in generator mode the motion in energy into electric energy to charge the energy store 24 and to thereby simultaneously provide a braking torque.

The inventive control of the electric machine has advantages particularly in so-called mild-hybrid vehicles. These are hybrid vehicles with electric motors having a relatively low power rating of no more than 25 kW, in particular no more than 205 kW, typically no more than 15 kW. Within the context of the present invention, electric motors with power ratings of preferably in the range of 7 to 20 kW, more preferably of approximately 15 kW, are employed.

The operation of the internal combustion engine 12 and of the power electronics 34 is controlled by a motor controller 36, in which a controller (indicated by the reference symbol 38) in form of a program algorithm is integrated. The controller described below can be used to operate the E-machine 14 according to the invention in an alternating generator mode (pulse charge operation). Alternatively, the controller 38 can also be implemented as a separate control unit.

Figure 2:
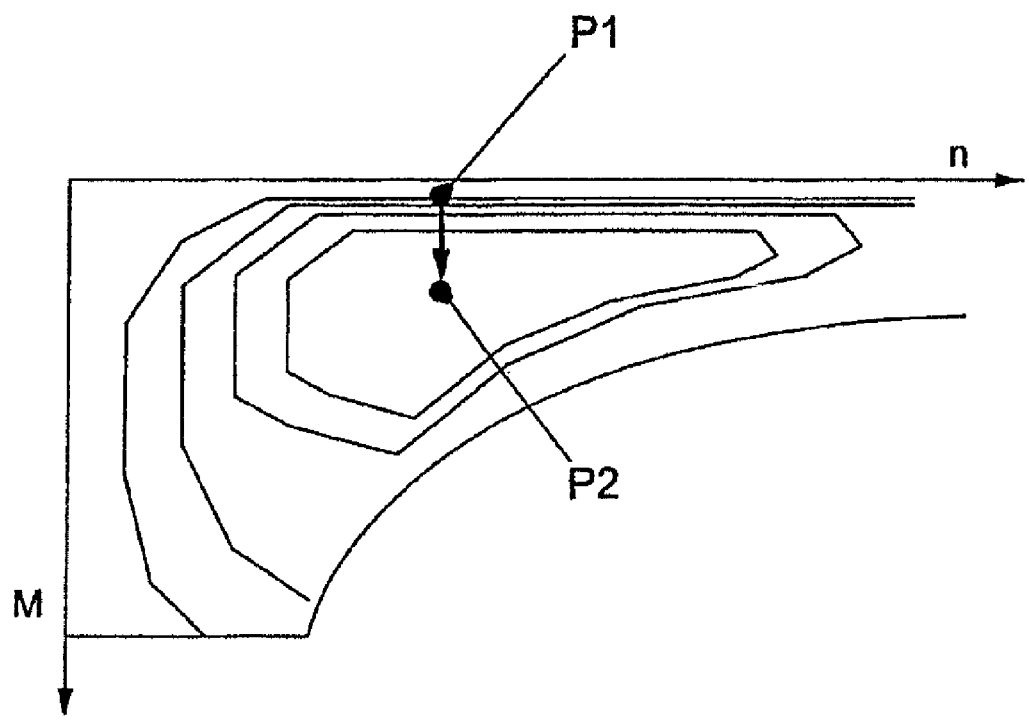
FIG. 2 shows a family of characteristic curves of an asynchronous machine operating in generator mode.
Figure 3:
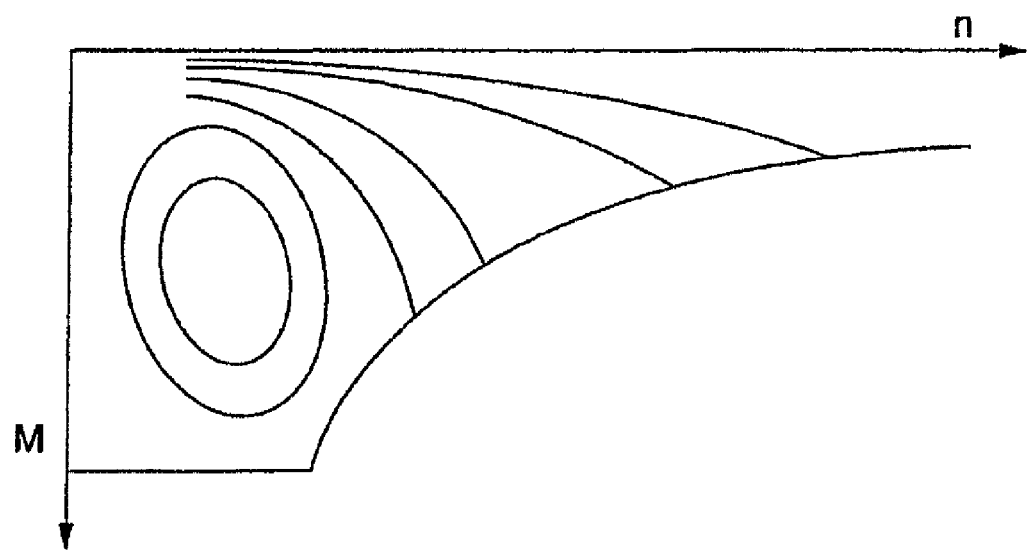
FIG. 3 shows a family of characteristic curves of a permanent-excited synchronous machine operating in generator mode.

FIGS. 2 and 3 depict a family of characteristic curves illustrating the generator efficiency of an asynchronous machine (FIG. 2) and a permanent-excited synchronous machine (FIG. 3) operated in generator mode as a function of the motor rotation speed n and the torque M. The (negative) generator torque M is equivalent to an electric power level of the E-machine 14 produced in generator mode and/or a braking torque applied to the crankshaft. The characteristic curves in the diagrams indicate points of identical efficiency. The closed inner characteristic curves represent regions of higher efficiency, with the efficiency decreasing toward the outside.

The permanent excited synchronous machine (FIG. 3) has typically very high efficiencies only in a limited region of the family of characteristic curves, which the efficiencies decreasing significantly at higher rotation speeds. Conversely, as seen in FIG. 2, the asynchronous machine typically has somewhat lower peak efficiencies, but has relatively high efficiencies even at high rotation speeds. Both types of machines have in common that for a very low torque demand and a correspondingly low electric power operation, the efficiencies decrease significantly, meaning that a relatively large amount of kinetic energy is used to produce a relatively small amount of generator power. In addition, the synchronous machine, due to its permanent magnetic field, exhibits a residual braking torque or a residual torque from electric power, even if the machine does not demand any torque. Conversely, the asynchronous machine can operate entirely without magnetic excitation at the zero power demand and can therefore be switched off practically without losses. Due to these properties, the advantageous effect of the method of the invention is hence particularly pronounced for the asynchronous machine. However, the method of the invention can basically be employed with all types of E-machines, preferably those E-machines that can be switched off at zero power demand without losses.

Figure 4:
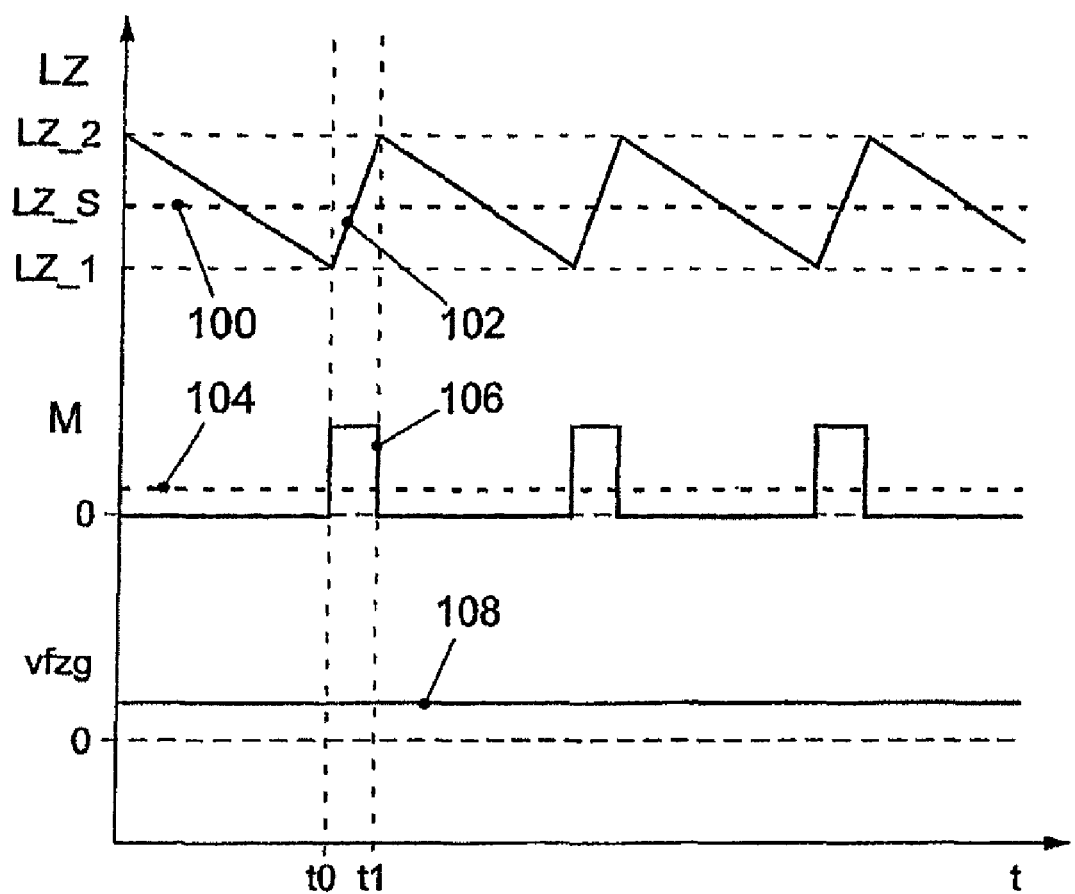
FIG. 4 shows the time dependence of a charge state of an energy store, a generated torque and a vehicle speed during a conventional continuous and an inventive discontinuous generator operation of an electric machine.

The principle of the method of the invention is illustrated more particularly in FIG. 4. The curves 100 and 102 illustrate the time dependence of a charge state LZ of the energy store 24 during conventional continuous generator operation and during alternating (pulse) generator operation according to the present invention, respectively. The curves 104 and 106 illustrate the time dependence of a negative torque M produced by the electric machine 14 in generator mode (braking torque), which represents a supply of electric power, according to the conventional method and the inventive method, respectively. A curve of the vehicle speed vfzg is shown in the lower part of the FIG. (curve 108).

As shown in the example depicted in FIG. 4, a constant operating phase of the hybrid vehicle—as indicated by the constant vehicle speed vfzg—and an actual, relatively low electric power demand from the vehicle electrical system 26 is assumed. In this situation, according to the conventional approach, the E-machine 14 is operated in generator mode with a small constant torque (curve 104). This torque corresponds to an actual electric power demand from the vehicle electrical system, whereby electric losses due to electric wiring and voltage conversion are taken into account in form of a Delta value that is to be added to the power. During this time, the energy store 24 remains constant at its nominal charge state LZ_S (curve 100), because the entire electric power demand of the vehicle electrical system 26 is supplied by the generator-produced power (curve 104). The operating point of the electric machine 14, when supplying only a small amount of electric power at a predetermined rotation speed n, is indicated in FIG. 2 by the exemplary point P1. Due to the small generator torque and the low generator power, respectively, the E-machine 14 operates with low efficiency, so that the mechanical power received via the crankshaft is relatively high compared to the electric power received in generator mode, which also negatively affects the fuel consumption of the internal combustion engine 12.

In this operating mode, the E-machine 14, in combination with the electric energy store 24, is operated according to the method of the invention with a pulse charge, whereby a deviation of the charge state LZ from the nominal charge state LZ_S is intentionally permitted. According to FIG. 4 (curve 102), the vehicle electrical system 26 initially receives power exclusively from the energy store 24 (and optionally the buffer battery 30). This continues until the charge state LZ of the electric energy store 24 reaches a lower switching threshold LZ_1 at time t0. During this time, the E-machine 14 is completely switched off in this initial phase and does not produce a torque or electric power (curve 106). When reaching the lower switching threshold LZ_1 at time t0, the E-machine 14 is switched into generator mode at a torque M and/or at an electric power level significantly higher than can be achieved with the conventional method. In this interval, the vehicle electrical system 26 is supplied with electric power and the energy store 24 is charged with electric power supplied by the E-machine 14, as evident from a steep increase of the charge state LZ. The load level in this phase is indicated in FIG. 2 by the point P2 and is located at significantly higher generated torques than with the conventional method. As further illustrated, the load level shift in this interval is accompanied by a noticeable increase in the efficiency. The generator operation of the E-machine 14 is maintained until the charge state LZ reaches an upper switching threshold LZ_2 at time t1. At this time, the E-machine 14 is switched off again, and the vehicle electrical system is powered thereafter exclusively from the energy store 24, accompanied by a decrease in the charge state LZ.

The lower and the upper switching thresholds LZ_1, LZ_2 have a respective separation, both below and above, from the nominal charge state LZ_S of the energy store 24 of at most 20%, in particular at most 10% and more particularly at most 5% compared to a maximum charge state of the energy store 24 of 100%. For example, for a separation of the switching thresholds of 5% with respect to a nominal charge state of 70%, the charge state LZ of the energy store 24 oscillates in alternating generator operation between 65% (LZ_1) and 75% (LZ_2). It is also feasible to define the upper and lower switching thresholds independent of each other, which then have a different separation from the nominal charge state LZ_S.

The method can also be employed when the generator power is not only used for powering the vehicle electrical system 26, but in addition or alternatively for increasing the charge state LZ of the energy store 24 to a nominal charge state LZ_S. It will be assumed, however, that the total power demand from the vehicle electrical system 26 and/or the energy store 24 is so small that the E-machine 14 has only a low efficiency during constant generator operation. The method of the invention can therefore advantageously be used independent of an actual demand from the vehicle electrical system, when power demand from the E-machine 14 in generator mode is low.

The method of the invention is preferably used when an improved efficiency can be expected as a result of the discontinuous operation according to the invention compared to a continuous operation of the E-machine 14. More particularly, one or more efficiency-dependent boundary conditions are defined, based on which the alternating operation is carried out or not. In particular, alternating operation is carried out when a threshold value for an actual power level demanded by the vehicle electrical system 26 (electric users 28 and a buffer battery 30) and/or the energy store 24 are smaller than 1200 W, preferably smaller than 800 W and more preferably smaller than 500 W. Preferably, within this context, the pulse charge is increased during the generator interval by at least 500 W, preferably by at least 1000 W, and most preferably by at least 1500 W compared to the total power demand.

The method can advantageously be employed when a ratio of the actual power demand from the vehicle electrical system 26 and/or the energy store 24 is less than 15%, preferably less than 10%, and most preferably less than 5%, of the actual maximum power that can be generated by the E-machine 14. In this case, the ratio of the total power demand to the maximum power obtainable from the E-machine is increased during the generator interval (pulse charge) by at least 5% (for example from 15 to 20%), preferably by at least 10% and most preferably by at least 15%.

The method of the invention is also advantageously employed when the E-machine 14 is operated in rotation speed ranges where the efficiency characteristics (see FIGS. 2 and 3) depend only slightly on the rotation speed n. In a preferred application, speed would be in a range of $n \geqq 1250$ $min^{-1}$ preferably $\geqq 1500$ $min^{-1}$, and most preferably at least $\geqq 2000$ $min^{-1}$. For the reasons mentioned above, it may also be advantageous not to employ this method at very high rotation speeds.

According to another advantageous condition for employing the method, the nominal charge state LZ_S of the energy store 22 must be in a predetermined range. This is necessary in order to provide, when taking into consideration the required tolerance about the nominal charge state LZ_S, to the energy store 22 a charge boost during alternating operation that can be visualized. For example, the nominal charge state LZ_S should have a separation from an upper permissible charge limit (which is typically 100% SOC) and/or from a lower permissible charge limit of at most 20%, preferably at most 10% and most preferably of at most 5% with respect to the maximum charge state of the energy store 22. Both limit values can also be selected independent of each other. According to a preferred embodiment, the lower charge limit can correspond to the nominal charge state LZ_S. In another embodiment of the invention, the nominal charge state LZ_S of the energy store 22 is intentionally defined in the controller 36, 38, so that the method can be implemented, while maintaining sufficient separation from the respective permissible upper and lower limits.

According to a particularly preferred embodiment, so-called efficiency accounting is performed in the motor controller 36 before and during the alternating generator operation of the invention, and the method is only performed when and for as long as with the actual operational boundary conditions an efficiency advantage is achieved over the conventional continuous method. In particular, an efficiency improvement of at least 2%, preferably at least 5% and most preferably at least 10% over the conventional operating mode is required. A load level shift of the internal combustion engine 12 caused by the variable generator operation of the E-machine 14 can advantageously also be taken into consideration for the efficiency accounting. While the internal combustion engine 12, typically operates in a region with a somewhat lower efficiency when the E-machine 14 is switched off, the internal combustion engine 12 has a higher load during the pulse charge operation of the invention and hence also a higher efficiency due to the increase in the load of the E-machine 14, i.e., the greater braking torque. By taking into consideration the efficiency shifts of the internal combustion engine 12, a total efficiency advantage for applying the method of the invention may be required that should be greater than the aforementioned values. Preferably, the effects from the slightly increasing charge storage losses of the energy store associated with the greater electric power as well as from wiring and connection losses can also be taken into consideration in the efficiency accounting.

The torque changes caused by the pulse charge method of the E-machine 14 according to the invention are compensated by the internal combustion engine to prevent adverse effects on the driving performance. Because torque compensation can only be performed with limited accuracy and limited speed, the application of the invention is limited particularly to those operating situations where the generated torque variations are relatively small and/or can be relatively easily compensated. It should also be taken into consideration that the magnitude of the torque variations depends on the change of the generator torque and/or the electric power, as well as on the gear ratio of the drive train. Advantageously, the maximum generator power during the intervals when the E-machine 14 operates in generator mode can be limited to maximally 10 kW, preferably maximally 5 kW, and most preferably to maximally 3 kW. It is also advantageous not to use the method with certain gear settings of transmission 16, in particular in reverse and in the first and second gear. In view of the foregoing, the method may advantageously only be activated at a vehicle speed above 15 km/h, preferably above 25 km/h, and most preferably above 40 km/h.

To allow an increase in the required load level of the internal combustion engine 12, a minimum separation between the actual internal combustion engine load and the full load characteristic of the internal combustion engine 12 should advantageously be maintained when activating the alternating generator mode. Preferably, the method is enabled only when the value of the actual internal combustion engine torque is no more than 90%, in particular no more than 85%, and most preferably no more than 75% of the maximum rated torque of the internal combustion engine. This approach is also advantageous to prevent mixture enrichment for the protection of components, which frequently occurs with the modern gasoline engines operating under full load and causes increased fuel consumption. The method is thus preferably also not carried out when the internal combustion engine 12 runs in component protection mode, for example to protect the catalytic converter, i.e., when the internal combustion engine 12 is operated with a richer mixture.

The efficiency advantage of the method of the invention will now be illustrated with reference to an exemplary calculation:

In a hybrid vehicle, the controller 36 determines an actual power demand from the vehicle electrical system 26 of 350 W. The nominal charge state LZ_S of a capacitor store 24 used in this example is reached. The E-machine 14 rotates at 3000 $min^{-1}$ and produces 400 W of electric power, including any wiring and voltage converter losses. The E-machine 14 (three-phase asynchronous machine) and an inverter required for its operation operate conventionally for producing this power with an overall efficiency of 60%.

With the discontinuous pulse charge method of the invention, the E-machine 14 is operated for a short time at 2 kW in generator mode, until reaching the upper switching threshold LZ_2 of the charge state LZ, thereby increasing the charge state LZ of the capacitor store 24 in addition to supplying the vehicle electrical system 26. Conversely, the E-machine 14 is completely deactivated until the charge state LZ drops to the lower switching threshold LZ_1. During operation at 2 kW, this system consisting of E-machine 14 and inverter operates with an efficiency of 80%. Because the available energy for supplying the vehicle electrical system is predominantly provided from the capacitor store 24 during the pauses when the internal combustion machine is switched off, the charging and discharging efficiencies of the capacitor store 24 must be considered. The double-layer capacitor used in this application has an efficiency of 95% for both processes. The efficiency of the supply for the vehicle electrical system (neglecting the changed efficiency of the internal combustion engine 12 during pulse charging) is then 0.8×0.95×0.95=0.72, i.e., 72%. Discontinuous operation according to the invention of the E-machine 14 therefore yields an efficiency advantage compared to continuous operation of +12%. The efficiency advantage is in practice slightly reduced when taking into account shifts of the load point of the internal combustion engine 12 and the slightly higher charging and wiring losses, but is still significant in comparison to the continuous operation.

LIST OF REFERENCE SYMBOLS

10 Hybrid drive unit
12 Internal combustion engine
14 Electric machine
16 Gear
18 Drive train
20 Clutch
22 Additional clutch
24 Energy store
26 Vehicle electrical system
28 Electric user
30 Buffer battery
32 DC/DC converter
34 Power electronics
36 Motor controller
38 Controller
M Torque
N Rotation speed
LZ Charge state of the energy store
LZ_S Nominal charge state
LZ_1 Lower switching threshold for the charge state
LZ_2 Upper switching threshold for the charge state
vfzg Vehicle speed

The invention claimed is:
1. A method for controlling an operation of a motor vehicle with a hybrid drive unit, which comprises an internal combustion engine and at least one electric machine coupled to a drive train of the motor vehicle, wherein the at least one electric machine is selectively operated in a motor operation mode and a generator operation mode, wherein, when the electric machine is operated in the motor operation mode, the electric machine powers the motor vehicle either alone or in addition to the internal combustion engine, and, when the electric machine is operated in the generator operation mode, the electric machine charges an energy store and/or powers a vehicle electrical system of the motor vehicle, wherein, when the electric machine is operated in the generator operation mode, depending on maintaining predetermined boundary conditions, the electric machine operates in an alternating generator mode and a continuous generator mode, wherein, when the electric machine is operated in the alternating generator mode, the electric machine is operated in a manner in which first and second intervals are alternated, wherein
 (a) in a first interval, the electric machine is operated with a first, high electric power output which is greater than an actual power consumption of the vehicle electrical system, and

(b) in the second interval, the electric machine is switched off, wherein an efficiency accounting is performed to determine an efficiency advantage of the alternating generator mode in comparison to the continuous generator mode, wherein the efficiency accounting takes into consideration a shift in a load level of the internal combustion engine, and further wherein the alternating generator mode of the electric machine is selected if the efficiency advantage of the alternating generator mode, determined by the efficiency accounting, reaches or exceeds a predetermined threshold value.

2. The method according to claim 1, wherein, in the second interval, the vehicle electrical system is supplied from the energy store and/or from a car battery.

3. The method according to claim 1, wherein the first interval is terminated when a charge state of the energy store reaches an upper switching threshold, and the second interval is terminated when the charge state of the energy store reaches a lower switching threshold.

4. The method according to claim 3, wherein the upper switching threshold and/or the lower switching threshold are independent of each other above or below, respectively, a desired charge state with reference to a maximum charge state of the energy store.

5. The method according to claim 3, wherein the upper switching threshold and/or the lower switching threshold are at most about 20% above or below, respectively, a desired charge state with reference to a maximum charge state of the energy store.

6. The method according to claim 3, wherein the upper switching threshold and/or the lower switching threshold are at most about 10% above or below, respectively, a desired charge state with reference to a maximum charge state of the energy store.

7. The method according to claim 3, wherein the upper switching threshold and/or the lower switching threshold are at most about 5% above or below, respectively, a desired charge state with reference to a maximum charge state of the energy store.

8. The method according to claim 1, wherein the alternating generator mode of the electric machine is used when the actual power demand from the vehicle electrical system and/or the energy store is smaller than 1200 W.

9. The method according to claim 1, wherein the alternating generator mode of the electric machine is used when a ratio of the actual power demand of the vehicle electrical system and/or the energy store to an actual maximum generator power supply from the electric machine is smaller than 0.15.

10. The method according to claim 1, wherein the alternating generator mode of the electric machine is used when an efficiency advantage of the alternating generator mode compared to the continuous generator mode exceeds at least 2%.

11. The method according to claim 1, wherein the alternating generator mode of the electric machine is used at rotation speeds of $\geq 1250$ min$^{-1}$.

12. The method according to claim 1, wherein the alternating generator mode of the electric machine is used when a desired charge state of the energy store maintains a minimum separation of less than 20% from a lower and/or an upper permissible charge limit value.

13. The method according to claim 1, wherein the alternating generator mode of the electric machine is used when at least one of the following boundary conditions is satisfied:

a minimum separation between an actual torque of the internal combustion engine and a maximum torque of the internal combustion engine is maintained;

the internal combustion engine is not actually operated with an enriched mixture to protect components;

the vehicle travels at an actual minimum speed; and a minimum gear of a vehicle gear transmission is engaged.

14. The method according to claim 1, wherein the alternating generator mode of the electric machine is used when the actual power demand from the vehicle electrical system and/or the energy store is smaller than 800 W.

15. The method according to claim 1, wherein the alternating generator mode of the electric machine is used when the actual power demand from the vehicle electrical system and/or the energy store is smaller than 500 W.

16. The method according to claim 1, wherein the alternating generator mode of the electric machine is used when a ratio of the actual power demand of vehicle electrical system and/or energy store to an actual maximum generator power supply from the electric machine of is smaller than 0.10.

17. The method according to claim 1, wherein the alternating generator mode of the electric machine is used when a ratio of the actual power demand of vehicle electrical system and/or energy store to an actual maximum generator power supply from the electric machine of is smaller than 0.5.

18. The method according to claim 1, wherein the alternating generator mode of the electric machine is used at rotation speeds of $\geq 1500$ min$^{-1}$.

19. The method according to claim 1, wherein the alternating generator mode of the electric machine is used at rotation speeds of $\geq 2000$ min$^{-1}$.

20. A motor vehicle with a hybrid drive unit, which comprises an internal combustion engine and at least one electric machine coupled to a drive train of the motor vehicle, wherein the at least one electric machine is adapted to be selectively operated in a motor operation mode and a generator operation mode, wherein, when the electric machine is operated in the motor operation mode, the electric machine is adapted to power the motor vehicle either alone or in addition to the internal combustion engine, and, when the electric machine is operated in the generator operation mode, the electric machine is adapted to charge an energy store and/or to power a vehicle electrical system of the motor vehicle, wherein the motor vehicle comprises control means configured to operate the electric machine, wherein, when the electric machine is operated in the generator operation mode, depending on maintaining predetermined boundary conditions, the electric machine operates in an alternating generator mode and a continuous generator mode, wherein, when the electric machine is operated in the alternating generator mode, the electric machine is adapted to operate in a manner in which first and second intervals are alternated, wherein (a) in a first interval, the electric machine is adapted to operate with a first, high electric power output which is greater than an actual power consumption of the vehicle electrical system, and (b) in a second interval, the electric machine is adapted to be switched off, wherein the control means is configured to perform an efficiency accounting to determine an efficiency advantage of the alternating generator mode in comparison to the continuous generator mode, wherein the efficiency accounting takes into consideration a shift in a load level of the internal combustion engine, and further wherein the alternating generator mode of the electric machine is selected if the efficiency advantage of the alternating generator mode, determined by the efficiency accounting, reaches or exceeds a predetermined threshold value.

* * * * *